Sept. 4, 1962    M. H. KRUGER    3,052,794
ILLUMINATED CEILING
Filed Dec. 7, 1959    4 Sheets-Sheet 1
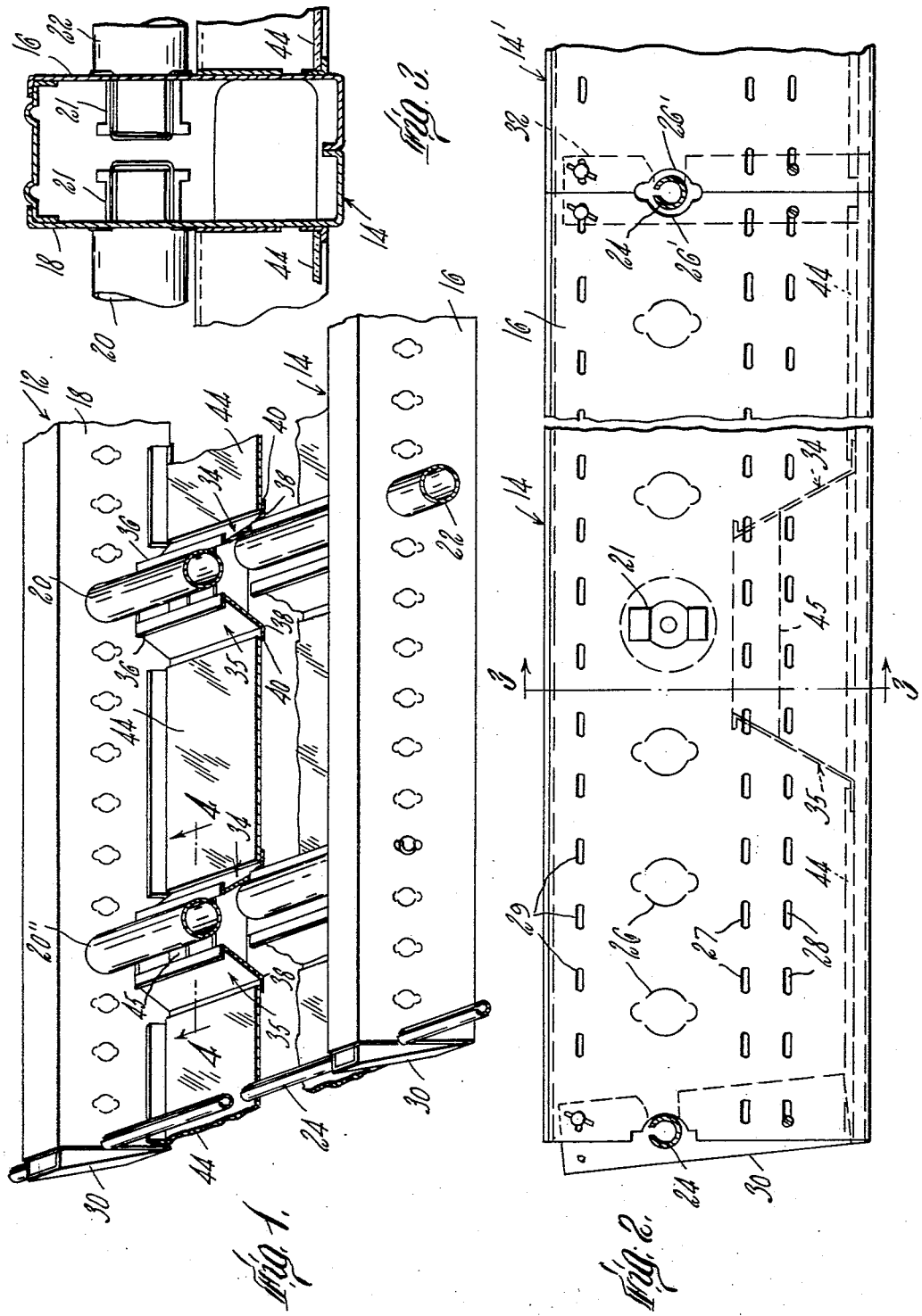

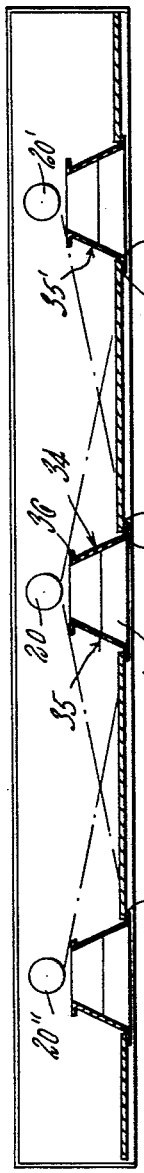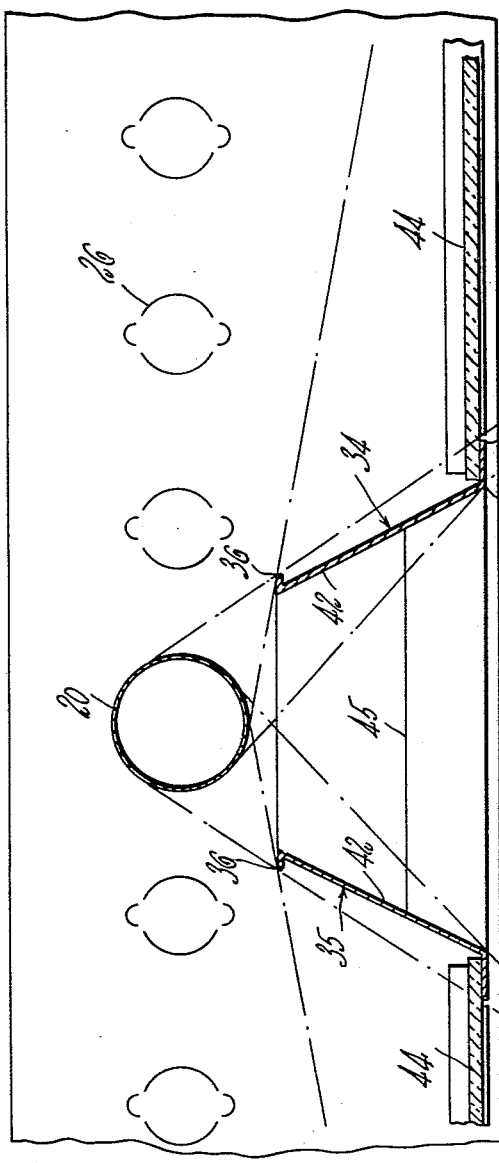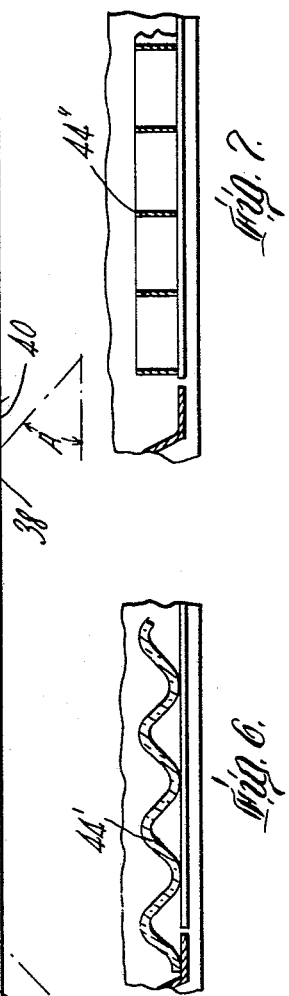

Sept. 4, 1962 M. H. KRUGER 3,052,794
ILLUMINATED CEILING
Filed Dec. 7, 1959 4 Sheets-Sheet 3

Sept. 4, 1962 M. H. KRUGER 3,052,794
ILLUMINATED CEILING
Filed Dec. 7, 1959 4 Sheets-Sheet 4
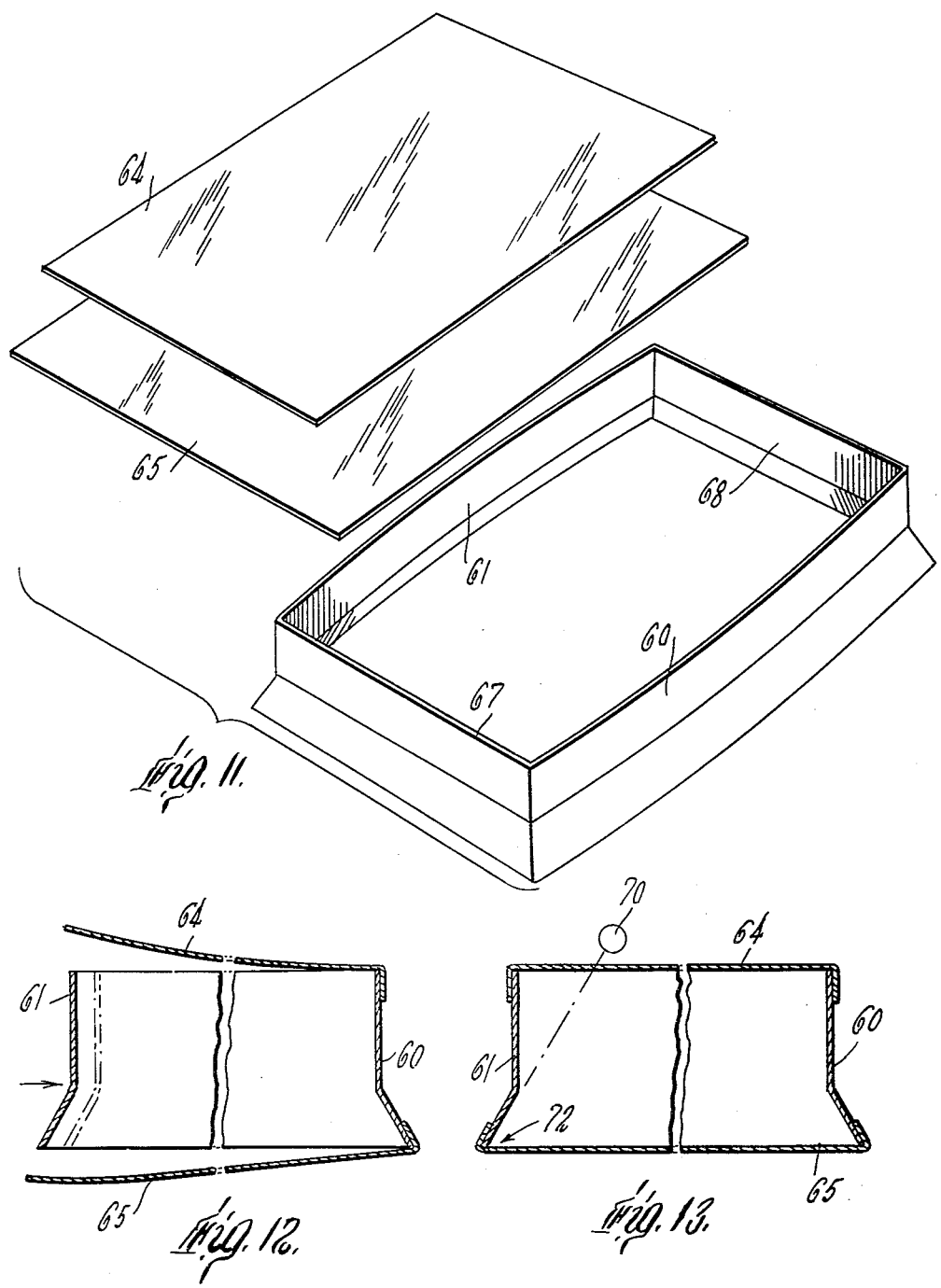

United States Patent Office 3,052,794
Patented Sept. 4, 1962

3,052,794
ILLUMINATED CEILING
Michael Henry Kruger, Chestnut Hill, Mass., assignor to Smithcraft Corporation, Chelsea, Mass., a corporation of Massachusetts
Filed Dec. 7, 1959, Ser. No. 857,746
10 Claims. (Cl. 240—9)

This invention relates to lighting, and more particularly to a method and structure for achieving illuminated ceilings, and relates generally to improvement in lighting structures.

For office buildings, places of recreation, and the like it is preferable that the entire ceiling of a room be illuminated to minimize occupant's eye strain, and for improved appearance.

With practical lighting systems heretofore known, to achieve relatively uniform illumination of a ceiling from above, it has been necessary to space a generally planar diffuser (the visible ceiling) at a substantial distance below horizontally spaced-apart bulbs; this "cavity" distance has been required to be greater than at least one-half the horizontal spacing between light bulbs. Thus, to achieve an illuminated ceiling with bulbs 3 ft. apart, an economical arrangement suitable to achieve lighting for office areas, it is necessary to have a cavity between bulbs and planar diffuser of a depth of at least 1½ ft. The required cavity distance increases directly with the distance between light sources. The expense of erecting new structures with this added ceiling space and the limited ceiling height of existing structures have severely limited use of illuminated ceilings.

There have been attempts to decrease this cavity depth, but these have not been wholly successful as they either cause uneven brightness of the ceiling or they involve undue absorption of the light for the sake of attaining even brightness.

Among the objects of this invention, therefore, is the provision of a system for efficiently achieving even brightness illuminated ceilings utilizing only a fraction of the previously required cavity depth, making illuminated ceilings feasible for most buildings.

Another object is to provide improvements in latticed fluorescent lighting assemblages, permitting use of identical structural elements to fulfill greatly varied lighting requirements.

Another object is to provide a luminous ceiling particularly unaffected in appearance by dirt and bugs falling thereupon which utilizes minutely thin plastic skins without sag and which has a minimum of opaque portions attributable to the supports thereof.

Another object is to provide an imrpoved, more economical lighting system from the standpoint of fabrication expenses.

Other objects will, in part, be obvious and will in part, appear hereinafter.

The invention involves a lighting source, a generally planar horizontal diffuser spaced below, to the side thereof, and an interposed light barrier, preferably a reflector, which proportionately blocks light, illuminating the diffuser at even brightness. The reflective surface of the barrier reflects and optionally diffuses the blocked light downward for illumination. The barrier also preferably supports the diffuser.

The barrier-reflector extends downwards from a point below major portions of the lighting source, and spaced to the side therefrom. Thus the barrier permits above passage of some light rays. With this relationship, the lighting source is so shaded from the diffuser that the amount of lighting source area emitting rays which are directed to outlying points on the planar diffuser is greater than that lighting source area emitting rays towards inward lying points on the planar diffuser. Thus, in accordance with the invention, even illumination of the planar diffuser is obtained. Moving outwards on the diffuser, as the angle of incidence of rays decreases, and the distance from the lighting source increases, there is a compensating progressive decrease in shading.

The barrier-reflector lower edge is preferably positioned at the side of the light source so that only that direct light which passes to that side of the source downwards at angles greater than a selected comfort angle, passes directly below the barrier-reflector (the comfort angle being formed by the line of sight of a radiation with the horizontal, accepted values in the illumination field ranging from 25° to 45°). The barrier-reflector slopes downwardly and outwardly from its upper edge so that direct light from the source having an angle less than the comfort angle, which does not pass over the barrier-reflector to the planar diffuser, impinges upon the barrier-reflector and is reflected downwardly at an angle greater than the angle of comfort. All light passing over the upper edge of the barrier-reflector passes directly to the diffuser and does not hit the outside surface of the barrier-reflector.

The invention will be more fully understood with reference to the following detailed disclosure taken in conjunction with the accompanying drawings wherein:

FIG. 1 is a perspective of one preferred embodiment of the invention partially cut away;

FIG. 2 is an elevational view of one side of a housing member of the embodiment of FIG. 1;

FIG. 3 is a sectional view of the housing member of FIG. 2 taken on line 3—3;

FIG. 4 is a view of the embodiment of FIG. 1 on line 4—4 on a slightly larger scale;

FIG. 5 is a section of a ceiling lighting system incorporating the preferred embodiments of FIG. 1, taken in a vertical plane perpendicular to the longitudinal axis of the elongated light sources;

FIG. 6 is a sectional view of one preferred type of planar diffuser;

FIG. 7 is a sectional view of another type of planar diffuser;

FIGS. 11–13 illustrate a new type of planar diffuser.

Figure 8:
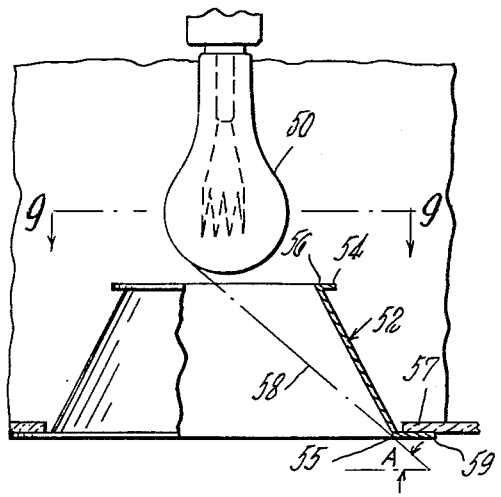
FIG. 8 is a vertical section of a frosted incandescent bulb lighting assembly according to the invention.

Referring to the preferred embodiment of FIGS.1–5, the lighting system comprises spaced-apart, horizontally disposed housing members 12, 14 as seen in FIGS. 1 and 2. Each of the housing members is comprised of two identical, spaced-apart, parallel, longitudinal side panels 16, 18 connected together, each comprised, as an instance, of metal. The housing members 12, 14 are spaced apart by hollow spacer tube means 24 which additionally serve to carry wiring from one housing member to the next. Side panels of the housing members are provided with a number of hole means. A first series, tube hole means 26, is comprised of spaced "knock-outs," each preferably having partially struck portions of the side panel retained therein which can be cleared by a blow upon the partially struck portion. Each series of tube hole means 26 lies in a horizontal plane, with centers of the hole means spaced at equal modular distances, here 3". Each hole means is in substantial alignment with an opposite number in the opposed side panel of the next adjacent spaced-apart housing member. These hole means are shaped to receive lamp holders 21 of any of the types available. Opposed side panels receive and support a plurality of spaced-apart elongated light sources, 20, 20,' 20", 22, e.g. fluorescent tubes, which span between spaced-apart housing members and abut the opposed sides thereof.

In each side panel, spaced below this series of tube hole means 26 are two horizontal series of hole means 27, 28. Another horizontal series of hole means 29 is located above the tube hole means 26. Holes 28, 29 are adapted for securement of stiffening end caps 30, 32. End cap 30 positions the spacer tubes 24 in half-tube hole means at the end of the housing member 14. End cap 32 joins end-abutting housing members 14, 14', matching half tube hole means 26' of the abutting housing members in this case positioning the tubular spacers 24. Hole means 27, 28, 29 provide means to secure ballasts within the housing member, spaced as desired.

The housing members 12, 14, 14' are suspended in a room in a "latticework" extending overhead, preferably over the entire floor area. As shown in detail for housing member 14, each intermediate housing member serves to support ends of elongated lighting sources 20, 22 at oppositely facing sides thereof in any of a large number of spaced combinations to provide optimum lighting for the particular activity involved. The extreme outside housing members, of course, support elongated lighting sources only at the inner side.

Combined with the latticework of housing members, for each elongated light source, is a pair of barrier-reflectors 34, 35 parallel with its elongated light source and abutting opposed side panels which support the pair. One of these barrier-reflectors is disposed slightly to one side of the light source and the other barrier-reflector is disposed to the other side. Each has an upper outer horizontal edge 36 slightly below and spaced from the side of the light source and each has a lower inner horizontal edge 38 spaced further to the side of the light source, lying on a line of sight which makes an angle of 40° with the horizontal and which is tangent to the lower portion of the light source. This lower edge 38 is thus positioned to block light radiating from the source at angles less than a predetermined comfort angle A, 40°. Each barrier-reflector also has a lower outer flange edge portion 40 extending only a slight distance outwards from edge 38, preferably wholly in the shadow of edge 36, provided to stiffen the barrier-reflector. Between the upper edge 36 and the lower portion of each of the barrier-reflectors 34, 35 extends a barrier-reflector surface 42, preferably a planar sheet metal member. Most flux from the source impinging upon this thus defined surface does so at highly acute angles, and all is reflected and diffused downwards at angles greater than the comfort angle.

A planar diffuser 44 lying in a horizontal plane extends away from the lower flange edge 40 of each of said barrier-reflectors along the length thereof, and is preferably supported thereby. The planar diffuser 44 as illustrated, is a sheet of translucent material. Referring to FIG. 6, a corrugated sound-absorbent translucent material may also serve as the planar diffuser 44'. Furthermore, referring to FIG. 7, an "egg crate" louver 44" may serve as the planar diffuser, as well as prismatic glass, etc. which may be utilized.

Referring specifically to FIGS. 4 and 5 the particular function of this embodiment is described as follows: Because edge portion 38 of barrier-reflector 34 lies on the limiting line of sight determined by angle A for optimum comfort, and because the barrier-reflector extends upwards therefrom, the direct light flux which emanates from portions of the light source facing this barrier-reflector, at angles to the horizontal less than angle A, is blocked. Observers looking upwards from that side of the light source at a visual angle of A or less are unable to see the light source, and, therefore, the brightness from that side is low. Diffusing baffles 45, transverse to the elongated bulbs or other similarly functioning members eliminate any brightness on lines of sight aligned with the longitudinal axis of the bulbs. Thus any direct lighting is of low brightness. That is to say, that observation of the ceiling, on lines of sight with angles to the horizontal of less than the comfort angle, will not reveal the light sources themselves, but only reflected, diffused light in the bulb regions of the ceiling.

It is preferred that any interior portions of barrier-reflectors visible from the sides at angles less than A be of a light diffusing quality adjusted to give diffused reflections at the same brightness level as adjacent portions of the illuminated planar diffusers, so that the same level of brightness is maintained throughout that portion of the ceiling.

The upper point of barrier-reflector 36, is adjacent to the source, spaced at a distance for instance of about a diameter of the light source away from the surface thereof and displaced more horizontally to the side than vertically below the axial center of the source, is thus so located as to shade most of the light source 20 from directly illuminating diffuser portions near barrier-reflector edge 40. Increasingly greater amounts of the source area directly illuminate portions of the diffuser 44 spaced progressively further away from the light source. In the preferred embodiment the series of light sources and their accompanying pairs of barrier-reflectors are so positioned that only portions of the planar diffuser 44 at the edge 40' of barrier-reflector 35' receives unblocked flux from next adjacent light source 20, all as indicated by lines of direction in FIGS. 4 and 5. By this arrangement variations in brightness of the planar diffuser are avoided, and each planar diffuser receives flux from two spaced-apart sources throughout its extent.

In FIGS. 11-13 there is shown a new, improved planar diffuser of the luminous type. This diffuser is comprised of a rectangular open-ended side frame of four thin sheet metal side members, 60, 61, 67, 68, each of which is formed with a slight outward bow as fabricated, all connected together at corners to define a shallow box, with a lower portion of a rectangular frusto-pyramid form. Opposite open ends of the frame are spaced apart on the order of 3". Across the lower open end, the larger, an extremely thin, (e.g. .007 inch) continuous sheet 65 of high tensile strength translucent plastic material is stretched and secured to the outer sides of the frame. This defines the visible ceiling. Across the opposite, smaller upper end is stretched a similar sheet 64, but of transparent qualities, simialrly secured to the frame. All sag is eliminated in these sheets by tension between the pulled-in bowed side members and the sheets. The transparent sheet side catches any dead bugs and dirt which falls thereupon and disperses any shadow effects therefrom over a wide area in the opposite translucent sheet, eliminating any detrimental centralized opaque effect in the illuminated ceiling.

Due to the outward flaring bottom portion, adjacent diffusers of this type can be brought in side by side contact to give the appearance of a continuous ceiling while sufficient space remains between for clearance of variations in the frames and for diffuser supporting members, etc. Light from central above bulbs 70, spaced inwards from the edge, illuminate flared portion 72, and no dark areas therefore, appear in the ceiling.

Figure 9:
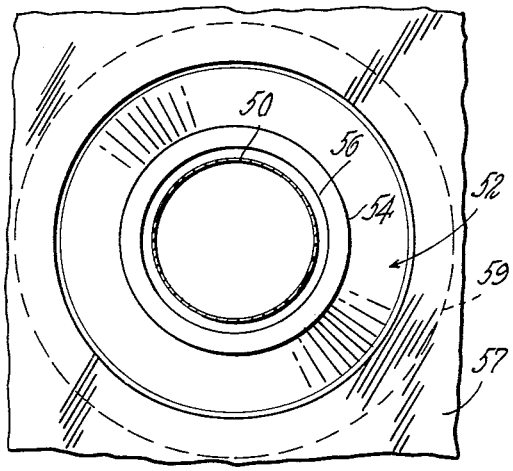
FIG. 9 is a horizontal section of the embodiment of FIG. 8 on line 9—9.

Referring now to the embodiment of FIGS. 8 and 9, a vertically suspended frosted incandescent bulb 50 in a ceiling system is provided with a circular barrier-reflector 52 suspended below the bulb. The upper circular edge 54 of the barrier-reflector, defined by a small stiffening flange 56, has an outer diameter substantially greater than the maximum diameter of the bulb, lies in a plane below at least most of the bulb, and is axially aligned with the vertical axis of symmetry of the bulb. The lower inner edge 55 of barrier-reflector 52 lies on the comfort line of sight 58 defined by the comfort angle A and the bulb. A horizontal planar diffuser 57 extends radially outward from the lower outer circular flange edge 59 of the barrier-reflector and is supported thereby. The lower flange edge 59 preferably lies entirely in the shadow of the barrier-reflector and serves to stiffen the barrier-reflector.

The particular orientation and relationship of the elements of the invention are hereafter described with reference to the diagram of FIG. 10.

A light bulb 80, of, for instance, an incandescent or fluorescent type, is suspended from a ceiling.

On the left side a point Z is arbitrarily established on a horizontal plane 87 at any given cavity depth, the point lying on a line of sight tangent with the lower side of the bulb which intersects the horizontal at a selected comfort angle A. A barrier-reflector is positioned with inner edge at Z, Z' being defined by the outer edge thereof. A tangent to the upper side of the bulb is projected from point Z'. Along this line a point X is established by intersection with a tangent to the lower side of the bulb passing through a given point Y on the horizontal plane. Point X then lies along the line of sight in line with the bottom-most portion of the bulb visible at Y and point X also lies on a line of sight in line with the uppermost portion of the bulb visible at point Z'. Following the teachings of the invention the barrier-reflector extends downward between the planes of points X and Z, and the planar diffuser extends between points Y and Z'.

The area of the planar diffuser lying outwardly from Z' is illuminated throughout at an even level of brightness, with a single bulb; this area can be very extensive even with cavity depths on the order of 6" to 10". Light emitted downward from the same bulb, and side illumination block and reflected by the barrier-reflector provide more intense downward illumination, at low brightness.

The particular relation of the barrier-reflector with the light source is established with reference to the following considerations:

For a "throw" of a substantial distance, to define a desired large area of illuminated ceiling at even brightness the line $\overline{XY}$ should make a very small angle B with the horizontal.

To define a substantial area of illuminated ceiling at even brightness the line $\overline{XZ'}$ should make a rather large angle C with the horizontal. Where the shadow cast by the barrier-reflector is to be minimized point Z', defining one edge of the illuminated planar diffuser should be close to point Z, the inner lower edge of the barrier-reflector (which is positioned to limit direct illumination at angles less than the comfort angle). Ordinarily a small stiffening flange separates the two points a distance of about ½".

The barrier-reflector structure should lie in a plane which does not block radiations allowed to pass over the upper edge of the barrier-reflector to minimize barrier shadow upon the ceiling.

Where barrier-reflectors are to be provided on opposite sides of the bulb without provision for being easily removed, hand access room for replacement of bulbs between the barrier-reflectors must be provided as indicated by lines 98, 99 defining an unencumbered space of, for instance, 4" width directly below the bulb.

As noted above, a very desirable limitation is that the cavity depth be minimized preferably to values between about 6" and 10".

For relatively bright illuminated ceilings it is preferable to have point Z' for one bulb coincide with point Y for the adjacent bulb.

Lighting requirements for a given room ordinarily define the necessary horizontal spacing between bulbs, and the desired brightness level of the illuminated ceiling, thus generally establishing the location and dimension of line $\overline{Z'Y}$ in the planar diffuser to be illuminated from the throw of a given bulb.

Figure 10:
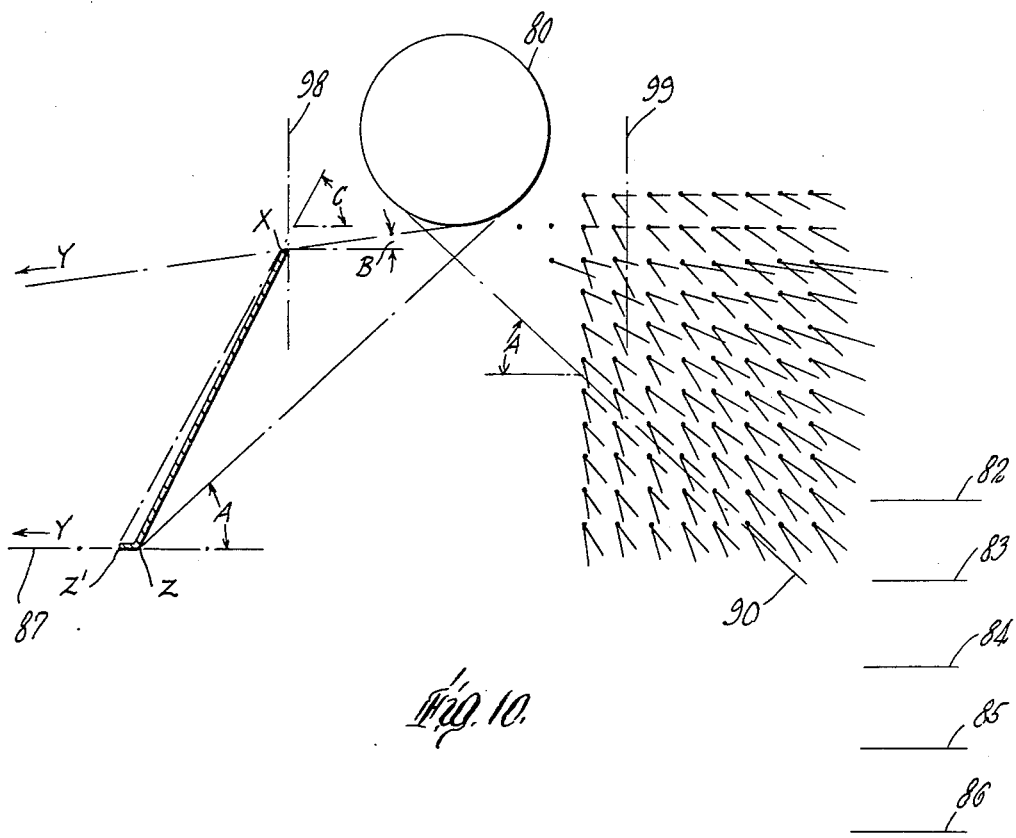
FIG. 10 is a diagrammatic representation of possible geometric relationships of the elements according to the instant invention.

With these limitations, following the right diagram portion of FIG. 10, the preferred position of point X, the upper edge of the barrier-reflector is determined. With reference to this diagram, it will be seen that to the right and below major portions of the bulb a number of points, possibilities for point X, are plotted and line of sight tangents to each side of the bulb are drawn outwardly from each point defining an angle therebetween. Horizontal planar diffuser surfaces 82, 83, 84, 85 and 86 are indicated at cavity depth increments. A comfort line of sight 90 intersecting the horizontal defines comfort angle A, the selected value here being 40°. This line of sight is projected tangent with the left side of the bulb and serves to position Z and Z' with respect to the bulb.

A small locus of permissible points for point X, in association each with a particular cavity depth, is defined by the particular comfort angle selected, the necessary hand space, and the amount of planar diffuser to be illuminated. Where cavity depth is to be absolutely minimized, the point highest in the group should be used.

It will be understood that the diagram is altered slightly for use with bulbs of different sizes. Where a larger bulb is employed the proportional relationship of the diameter of the bulb and the distance between lines 98, 99 defining room for hand access is altered; that distance being proportionately smaller with an increase in the diameter of the bulb. To use the same diagram for larger bulbs, the cavity depths must be scaled down, and the planar diffusers will appear proportionately closer to the bulb.

The essential features and main advantage of the instant invention is the elimination of substantial space between the lighting sources and the illuminated ceilings, eliminating for each story 1 ft. to as much as 3 ft. ceiling height; thus in a 50-story office building provided throughout with illuminated ceilings, according to my invention, savings upwards of 50 ft. of structure will be realized.

Another advantage of the elimination of substantial "dead" cavity space is the increased accessibility of artifices such as heating, ventilation and plumbing conduits suspended from the structural ceiling above the lighting system. Furthermore, unlike heretofore known systems, such as were embodied in my own Patent No. 2,734,126, easy access to lighting sources for replacement is obtained. It should be noted that to replace a bulb in the heretofore known illuminated ceilings, wherein the diffusers were suspended a foot or more below the bulbs, it was a difficult and dangerous task for a workman to mount a ladder and to reach upwards above the diffuser to remove and replace the bulbs. Now, according to my invention, the same bulbs which illuminate the ceiling are readily accessible, with no need to remove any portion of the illuminated ceiling.

Another distinct advantage of my invention is that no double frame support, one for the bulbs and one for the diffuser, need be used, an improvement over those systems as embodied in my own Patent No. 2,734,126. The housing members which support the lighting sources and ballast, in conjunction with the barrier-reflectors support the planar diffusers as well. Utilizing my system, uniform ceiling illumination is achieved with a much simpler structure than is heretofore known, involving fewer parts and less complicated connections.

Furthermore, according to my invention, there is no sacrifice of flexibility but rather with the same identical components, illuminated ceilings can be provided to achieve optimum lighting for any of the widely varied activities for which lighting is necessary. Thus, for example, according to my invention, illuminated bulbs may be placed on 1 ft. centers in merchandise display areas, 3 ft. centers for use in clerical offices and for drafting, 4 or 5 ft. for supermarkets, and 7 ft. for ceiling lighting in gymnasiums in which supplementary court lighting is utilized, all ceilings being illuminated evenly throughout at low brightness levels.

Another advantage over the prior deep cavity structures is that very efficient lighting is produced. A very large percentage of downward emitted light is available for high angle illumination, without brightness, which can be direct lighting. In comparison with prior illuminated ceiling systems according to this embodiment a much smaller proportion of the total light available for illumination illuminates the planar diffusers, and, therefore, upward reflection losses can be minimized.

Where "dead" lighting is desired with no specular reflection and little shadow, according to my invention it is entirely possible to utilize luminous members directly below the bulbs, between the paired barrier-reflectors.

Thus, many desired lighting qualities can be achieved with the instant invention.

Especially important in rooms having high perimeter ceiling ratio is the more efficient lighting achieved by my invention. In deep cavity systems considerable light must be directed to the walls to insure even illumination at the ceiling perimeter, shorter spacing of bulbs near the perimeter of ceilings being employed. A considerable amount of this light is wasted, being absorbed by the vertical walls extending upward from the edge of the diffusers. According to my new system, however, this waste can be eliminated.

I claim:

1. In an illuminated ceiling lighting system a horizontal planar light-permeable diffuser adapted to define a portion of the ceiling and to receive light on its upper side and transmit said light through its lower side, a light bulb spaced above it and sideways from a substantial portion thereof, and a barrier member having an upper edge adjacent to, but spaced sideways from and below said bulb, said planar diffuser having its portion which is nearest the bulb while on the opposite side of said barrier lying on a line of sight projected through said barrier upper edge and substantially tangential to the upper surface of said bulb so that light can pass over said barrier edge at lesser angles to the horizontal, downwardly to said planar diffuser, the barrier being a substantially opaque wall extending downwardly and outwardly from said upper edge to said planar diffuser, at an angle to the horizontal generally corresponding to but not less than the angle of said line of sight, allowing light to pass directly downward from said light source to the area below the ceiling being illuminated, the surface of said wall on the side facing the bulb having a diffusing finish, the barrier unshading said bulb progressively, first totally unshading the bulb emitting area relative to the plane of said diffuser at a point spaced substantially outwardly away from said planar diffuser portion nearest said bulb.

2. The illuminated ceiling lighting system of claim 1 wherein the barrier on the side facing the bulb has a lower edge lying on a line of sight tangent to the lower portion of said bulb, said line of sight forming with the horizontal an angle in the range between 25° and 45°, to limit ceiling brightness while allowing light to pass directly, downwardly from said bulb.

3. The illuminated ceiling lighting system of claim 1 wherein said light bulb is a horizontal elongated tube means, said barrier extends along one side of said elongated tube means in the direction of the longitudinal axis thereof, and said diffuser has a substantial extent outwards from said barrier at all points along the length of said tube means.

4. A lighting system including means holding at least a pair of elongated bulbs in spaced-apart, parallel, horizontal, opposed relation, a horizontal planar light-permeable diffuser mounted in fixed relation to said means in a plane below that of said bulbs, and extending between said bulbs, and two barriers mounted in fixed relation to said means, parallel to each other and to said bulbs, one barrier being associated with each bulb, and disposed in a progressively unshading relation between it and said planar diffuser, each barrier having an upper edge adjacent to but spaced downwardly and sideways from its bulb, lying on a line of sight with the portion of the planar diffuser between said barriers nearest said bulb which line of sight is substantially tangential to the upper part of the bulb, said barrier upper edge lying on a line of sight tangent to the lower part of the bulb which projects outwardly at least to a point in the planar diffuser beyond the center of said diffuser.

5. The system of claim 4 wherein the upper edge of each of said barriers is spaced from the center of its bulb a distance on the order of the diameter of said bulb, its spacing sideways therefrom being greater than its spacing downwardly.

6. The system of claim 4 wherein each barrier upper edge lies on a line of sight tangent to the lower part of its bulb which projects outwardly to the portion of said planar diffuser immediately adjacent the other barrier.

7. The system of claim 4 wherein said means comprises a pair of horizontal, spaced-apart, parallel housings between which said bulbs extend, said barriers being supported at their ends by said housings, each of their said housings having a multiplicity of spaced-apart knockout portions, into two of which each of said bulbs are mounted.

8. The system of claim 4 wherein said barriers are elongated sheet strips defining walls extending downwardly and outwardly relative to their respective bulbs from said upper edges at angles with the horizontal slightly greater than those of said lines of sight through said upper barrier edges and the adjacent portions of the diffuser, said strips having lower edge portions bent outwardly in the shadow of said walls, supporting therebetween said planar diffuser.

9. An illuminated ceiling lighting system comprised of at least three spaced-apart parallel horizontally disposed, opposed housing members, the intermediate housing member having two spaced-apart side panels, each being provided with a horizontally disposed series of individual light source hole means spaced in equal increments therealong, and the outer housing members having inner side panels provided with a similar series of tube hole means, individual hole means of opposed side panels being generally aligned, spacer means disposed between said housing members holding them in position, and a plurality of spaced-apart, parallel, opposed, horizontal, elongated fluorescent light sources extending between each pair of opposed side panels, each source being engaged in mounting means in a pair of said aligned hole means in said opposed panels, a horizontal planar diffuser extending between each pair of opposed spaced-apart fluorescent sources, disposed in a horizontal plane below the plane of said sources, and two elongated barriers corresponding with each of said spaced-apart sources, parallel to the corresponding source and to each other, one below and to one side of its source and the other below, and to the other side thereof, said planar diffusers being engaged for support by said barriers, said barriers each having an uppermost edge on a line of sight passing through the portion of the planar diffuser adjacent said barrier which is generally tangent to the upper side of said fluorescent source, and also on a line of sight through a portion of said planar diffuser spaced outwardly from said source beyond the midpoint of said diffuser generally tangent to the lower side of said fluorescent source whereby spaced-apart sources directly illuminate said planar diffusers throughout, the barriers for each source being spaced apart defining an opening downwardly directly below said source.

10. A ceiling lighting fixture having a horizontal, elongated fluorescent bulb and comprising means for positioning and energizing said bulb, two horizontal, planar, light-permeable diffuser elements, each spaced below said bulb, one to each side thereof, and two barrier members parallel to said bulb, one on each side thereof, each barrier having an upper shading edge adjacent said bulb, but spaced sideways and slightly below it, and having a light-impermeable wall portion extending downwardly, and outwardly from said bulb to a lower edge on a line of sight tangent to the lower surface of said bulb which intersects the horizontal at an angle in the range of between 25° and 45°, each planar diffuser having a first edge adjacent the lower outer edge of that barrier which is on the corresponding side of the bulb, each planar diffuser extending outwardly therefrom relative to said bulb to a second edge, the upper barrier edge aligned with said first edge of the corresponding diffuser and, said bulb shading substantially the entire bulb from that diffuser edge and progressively unshading said bulb outwardly over the entire outward extent of said diffuser, said barriers being spaced apart, defining an opening below said bulb adapted to pass light directly downwardly, and to enable the bulb to be inserted and removed.

References Cited in the file of this patent

UNITED STATES PATENTS

| | | |
|---|---|---|
| 1,735,209 | Nelson | Nov. 12, 1929 |
| 1,893,174 | Labreche | Jan. 3, 1933 |
| 2,189,008 | Kurth | Feb. 6, 1940 |
| 2,303,747 | Kuhl | Dec. 1, 1942 |
| 2,734,126 | Kruger | Feb. 7, 1956 |
| 2,854,565 | Kruger | Sept. 30, 1958 |
| 2,951,147 | Gilbert | Aug. 30, 1960 |
| 2,956,150 | Schwartz et al. | Oct. 11, 1960 |

FOREIGN PATENTS

| | | |
|---|---|---|
| 813,215 | Great Britain | May 13, 1959 |

OTHER REFERENCES

Transactions of Illuminating Engineering Society, July, 1937 (pages 750–752). (Copy in Div. 53.)